Dec. 26, 1961     A. J. CARROLL ETAL     3,014,614
DISPOSABLE MOLD
Filed July 9, 1958
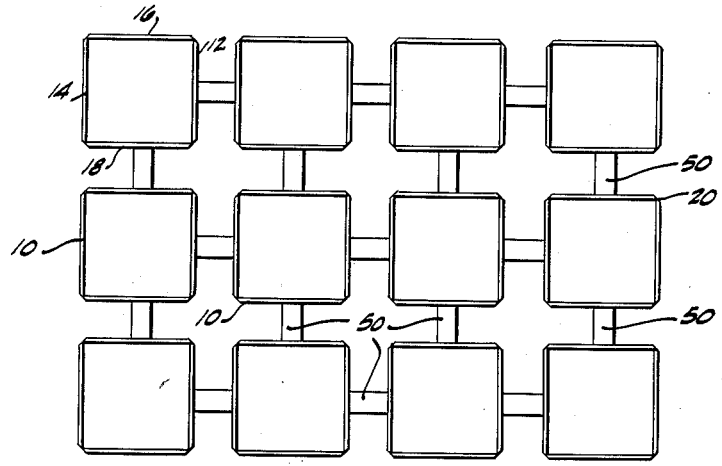
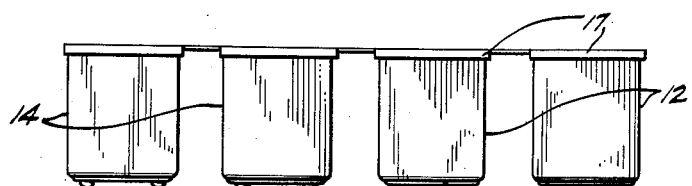
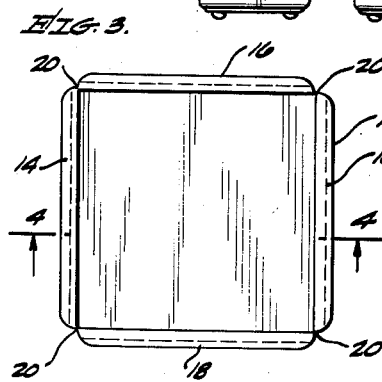
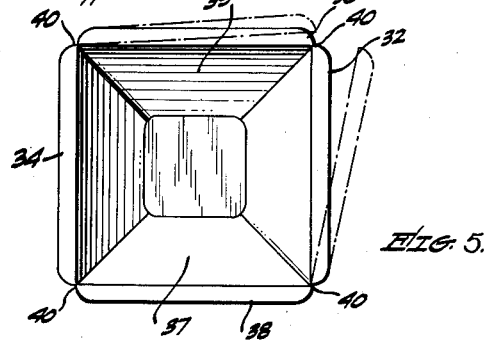
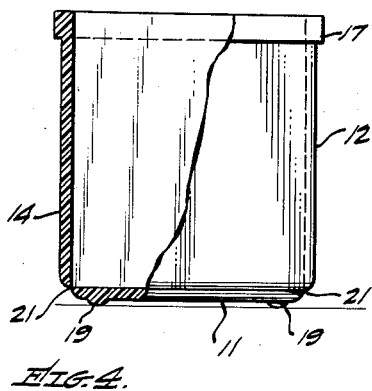
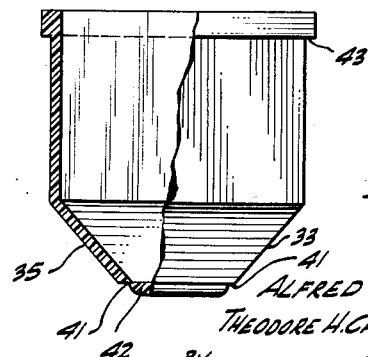
INVENTORS.
ALFRED J. CARROLL,
THEODORE H. CHAMBERLIN,
BY William D. Spensley
ATTORNEY.

United States Patent Office 3,014,614
Patented Dec. 26, 1961

3,014,614
DISPOSABLE MOLD
Alfred J. Carroll, 2740 E. 2nd St., Long Beach 3, Calif., and Theodore H. Chamberlin, 12121 Ballantine Drive, Los Alamitos, Calif.
Filed July 9, 1958, Ser. No. 747,541
4 Claims. (Cl. 220—83)

This invention relates to disposable molds and more particularly to a disposable plastic mold for delicate materials wherein it is required to maintain the molded shape of the material after it is removed from the mold.

In various applications, particularly in the fields of medicine, it is necessary to mold materials in such a way that upon removing the molded material from the mold the material will maintain its configuration. For example in so-called tissue molds utilized in the medicinal and pharmaceutical fields, a sample of tissue is embedded in paraffin in order that thin slices of the paraffin-embedded tissue may be cut to form microscopic slide sections. That is, apparatus for cutting extremely thin sections of paraffin in which tissue has been embedded are well known to the art. However, in the state of the art prior to the present invention it has been difficult to form the paraffin-tissue molds in such a way that the sample remains intact after the paraffin and tissue have been removed from the mold.

Similar applications of disposable molding means will be apparent to those skilled in the art, such as molds for diagnostic jellies whereas in various fields other than the medicinal and pharmaceutical fields such disposable molds also are advantageous or necessary for forming configurations of materials such as foodstuffs including jellies and jams wherein it is desirable to remove the portion of jelly or jam from the mold while maintaining its molded configuration. In addition, various molding operations wherein the material being molded is not delicate, the present invention is advantageous in that the mold used to form the configuration of the material may be easily removed from the material.

Accordingly it is an object of the present invention to provide an improved disposable mold wherein the mold may be easily and quickly removed from the molded material.

It is another object of the present invention to provide an improved disposable mold wherein the mold can be removed from the molded material without damage to the material being molded or disturbance of its molded configuration.

Yet another object of the present invention is to provide such a molding container which may be quickly and economically manufactured.

The present invention comprises an improved molding container formed of material such as plastic. The container is defined by walls of predetermined thickness. The junction between the various walls of the container is reduced in thickness substantially below the predetermined thickness such that a weakened line is formed. The junction of the various walls is liquid-tight, however, a bending force upon the side walls or walls of the container will cause separation of the walls at the junction line.

The novel features which are believed to be characteristic of the invention both as to its organization and method of operation together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

FIGURE 1 is a plan view of a cluster of mold containers formed in accordance with the present invention;

FIGURE 2 is a view in elevation of the cluster shown in FIGURE 1;

FIGURE 3 is an enlarged plan view of a single mold container;

FIGURE 4 is a view in elevation taken along line 4—4 of FIGURE 3;

FIGURE 5 is a plan view corresponding to FIGURE 3 of an alternative embodiment of the present invention which also shows in phantom the side walls of the container in the breaking away position; and FIGURE 6 is a view in elevation taken along line 6—6 of FIGURE 5.

Referring now to the drawing wherein like reference characters designate like or corresponding parts throughout the several views, there is shown in FIGURE 1 a cluster of mold containers in accordance with the present invention while in FIGURE 3 a detailed or enlarged plan view of a single mold container removed from the cluster is shown. Referring now to FIGURE 3, the mold container in its presently preferred embodiment comprises a rectangular cup having an open upper surface. While the mold containers of the present invention are not limited to the molding of any particular material they are especially advantageous in connection with molds known as tissue molds used in the medical laboratories and accordingly the mold container of the present invention will be described in connection with such use. In forming microscopic sections of human tissue for laboratory analysis the tissue is embedded in paraffin so that it can be sliced or cut very thin by microscopic section cutting machines of the type well known to the art. In order to form such microscopic sections, a section of human tissue is placed in a cup of the type shown in FIGURE 3 after which molten paraffin is poured into the cup and allowed to harden, thereby embedding the tissue in paraffin. The size of the molded paraffin with the tissue embedded therein is determined in the illustrative application by the size of the machine which is used to slice sections from the paraffin mold. Thus the mold container as used for forming tissue sections comprises a rectangular cup 10 having a bottom 11 and four side walls 12, 14, 16 and 18 as shown particularly in FIGURES 3 and 4.

The walls of the container are formed of material such as polyethylene plastic. In order to position the mold container 10 while the paraffin or other material is poured into the mold a shoulder 17 is formed at the upper edge of each of the side walls for retention of the mold in a suitable rack. Similarly, if the material is to be formed while the mold retainer is resting upon the bottom surface, protrusions 19 are preferably formed at the lower surface of the bottom wall 11. In accordance with the present invention the juncture of each of the side walls forming the container and the juncture of each of the side walls with the bottom wall are reduced in thickness, for example, by forming the polyethylene cup in a suitable die. Thus as shown in FIGURES 3 and 4 the juncture between the side walls 12 and 16 is reduced in thickness at the point 20 as is also the juncture between the side walls 12 and 18 reduced at 20. A similar reduction in thickness of the plastic walls is provided as indicated by the numeral 20 at the juncture between the side walls 16 and 14, and 14 and 18. The four side walls at their mating line with the bottom wall 11 are also reduced in thickness at the juncture lines 21. Accordingly each line where the side walls or bottom wall of the container meet are reduced in thickness and the thickness of the wall at the juncture line is such that the container is liquid-tight to form a closed cup for molding but is of such thickness that it may be easily broken or torn. Accordingly, if the side wall 12 is pulled outward at its upper edge, the lines 20 at each end of the side wall will separate to let the side wall 12 be torn away from the cup.

In operation, therefore, when the mold container 10 is used to form a tissue mold the tissue is placed within the cup such that it rests upon the bottom wall 11. Molten paraffin is then poured into the cup to the depth desired in the finish molded configuration. The paraffin is allowed to set and harden, after which the paraffin with the tissue embedded therein is removed from the mold by pulling each side wall away from the molded material. That is, the side wall 12 is pulled outward at its upper edge such that it tears downward along the lines of decreased wall thickness, and each of the other side walls is similarly removed. When the side walls are pulled outward they will also separate from the bottom wall along the line of decreased thickness 21. Thus, the molded paraffin is removed from the mold container quickly and easily with no damage to the mold through the removal.

FIGURES 5 and 6 illustrate an alternative embodiment of the present invention as used for forming tissue molds in which the desired configuration of the molded paraffin with the tissue embedded therein is such that an inward taper is produced near the bottom of the cup. The portion of the paraffin which would contain the tissue is thus of a smaller cross-sectional area than in the configuration defined by the embodiment of FIGURES 3 and 4. The manner of forming the mold container and of removing the mold container from the hardened paraffin is similar to that previously described in connection with FIGURES 3 and 4. That is, the side walls 32, 34, 36 and 38 are substantially vertical and meet at a juncture line of reduced thickness 40 as described previously. The side walls 35, 37, 33 and 39 are inwardly and downwardly tapered to a bottom wall 42 of reduced transverse area. All juncture lines between the various side walls and the bottom wall are reduced in thickness as previously described such that the bottom wall 42 is joined to the tapering side walls 33, 35, 37 and 39 by lines of reduced thickness 41. A flange for holding the mold container while in use is provided at 43 similar to the flange 17 of the embodiment shown in FIGURES 3 and 4. Thus in this embodiment, a smaller section of tissue will be deposited in the cup proximate the bottom wall 42 and the cup is filled with molten paraffin. Again, after the paraffin has set and hardened, each of the side walls may be broken away by causing them to separate along the separation lines 40 between the side walls and the separation lines 41 between the tapered side walls and the bottom wall 42.

In FIGURES 1 and 2 there is shown a presently preferred embodiment of the manner of molding or forming the mold containers in clusters so that they are convenient for use. That is, a cluster of twelve containers similar to that shown in FIGURES 3 and 4 is formed by dies with joining straps 50 connecting each of the containers to each adjacent container. The mold containers are then supplied to the laboratory, or other facility utilizing the containers, in clusters as shown in FIGURES 1 and 2. The individual mold container can be used in the cluster or it can be separated from the cluster by cutting the straps 50 which join it to each of the other containers in the cluster.

In the presently preferred embodiment in which polyethylene plastic is used, the force required upon the side walls to separate the walls from the mold container is relatively slight. The optimum thickness both of the side walls and bottom walls forming the container and the thickness of the plastic at the separation lines may be readily determined from the foregoing by one skilled in the art for the various applications. Although the reduced thickness of the separation lines is formed by dies in the present embodiment, other methods of forming may also be used. For example, the cup may be formed and then the lines may be reduced by grinding, shaving or the like. In addition, although the present invention has been described in connection with tissue molds, its utility and advantages for use in molding other materials will be readily apparent. For example, in molding individual servings of foodstuffs such as jellies, it may be seen that the jelly can be maintained in the desired configuration after being removed from the mold container as previously described.

What is claimed is:

1. A disposable mold comprising: an integrally formed open ended and liquid tight container having a bottom wall and side walls of predetermined wall thickness, the juncture lines of at least one of said walls with the adjoining side walls being of a thickness substantially less than said predetermined wall thickness, whereby at least one of said walls may be separated from the adjoining walls by tearing along the juncture lines.

2. A disposable mold comprising: an integrally formed open ended and liquid tight container having a bottom wall and side walls of predetermined wall thickness, said container walls being formed of a relatively inflexible material, separation lines in said walls, said separation lines being of a thickness substantially less than said wall thickness, said separation line thickness being sufficiently small that a force on said walls of the container will cause separation along said lines.

3. A disposable mold comprising: an integrally formed open ended and liquid tight container having a bottom wall and side walls of predetermined wall thickness, said walls being formed of polyethylene plastic of predetermined thickness, separation lines defined at the juncture of each of said walls, said separation lines being defined by a wall thickness substantially less than said predetermined wall thickness, whereby said walls may be separated from the adjoining walls by tearing along the juncture lines.

4. The mold container in accordance with claim 3 which also includes separation lines defined between each of said side walls and said bottom wall.

References Cited in the file of this patent
UNITED STATES PATENTS

| | | |
|---|---|---|
| 1,440,544 | Katzinger | Jan. 2, 1923 |
| 1,701,619 | Kendall | Feb. 12, 1929 |
| 1,897,570 | Bowman | Feb. 14, 1933 |
| 2,161,162 | Murguiondo | June 13, 1939 |
| 2,349,088 | Guyer | May 16, 1944 |
| 2,640,623 | Ryder | June 2, 1953 |